US012672035B2

(12) United States Patent
Dauneria et al.

(10) Patent No.: US 12,672,035 B2
(45) Date of Patent: Jun. 30, 2026

(54) NETWORK-INITIATED SLICE-BASED SESSION HANDOVER

(71) Applicant: Telefonaktiebolaget LM Ericsson (publ), Stockholm (SE)

(72) Inventors: Ankur Dauneria, New Delhi (IN); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 453 days.

(21) Appl. No.: 18/028,794

(22) PCT Filed: Sep. 28, 2020

(86) PCT No.: PCT/IB2020/059066
§ 371 (c)(1),
(2) Date: Mar. 28, 2023

(87) PCT Pub. No.: WO2022/064264
PCT Pub. Date: Mar. 31, 2022

(65) Prior Publication Data
US 2023/0379775 A1      Nov. 23, 2023

(51) Int. Cl.
*H04W 36/00* (2009.01)
*H04W 36/14* (2009.01)

(52) U.S. Cl.
CPC .. *H04W 36/00837* (2018.08); *H04W 36/0011* (2013.01); *H04W 36/14* (2013.01)

(58) Field of Classification Search
CPC ..... H04L 63/107; H04L 63/108; H04W 28/14
See application file for complete search history.

(56) References Cited

U.S. PATENT DOCUMENTS 12,063,711 B2 * 8/2024 Tiwari ................. H04W 12/03
12,495,391 B2 * 12/2025 Zhang ................. H04W 48/18
(Continued)

FOREIGN PATENT DOCUMENTS

CN       109906630 A      6/2019
CN       111226472 A      6/2020
(Continued)

OTHER PUBLICATIONS

Author Unknown, "Technical Specification Group Services and System Aspects; Procedures for the 5G System (5GS); Stage 2 (Release 16)," Technical Specification 23.502, Version 16.2.0, Sep. 2019, 3GPP Organizational Partners, 525 pages.
(Continued)

*Primary Examiner* — Douglas B Blair
(74) *Attorney, Agent, or Firm* — Withrow & Terranova, PLLC

(57) ABSTRACT
Systems and methods are disclosed herein for network-initiated slice-based handover in a cellular communications system. In one embodiment, a method in a cellular communications system comprises, at a network node in a core network of the cellular communications system, detecting a triggering event for a network slice handover for a session of a particular wireless communication device. The method further comprises, at the network node and responsive to detecting the triggering event, identifying a target network slice for the network slice handover and sending, to a Policy and Control Function (PCF) in the core network, a message that initiates a network slice handover of the session from a source network slice to the target network slice. The method further comprises, at the PCF, receiving the message that initiates the network slice handover and performing an action to cause the network slice handover.

2 Claims, 9 Drawing Sheets

(56) References Cited

U.S. PATENT DOCUMENTS

| | | | | |
|---|---|---|---|---|
| 12,543,244 | B2 * | 2/2026 | Jeong | H04W 24/04 |
| 2018/0332523 | A1 * | 11/2018 | Faccin | H04W 36/385 |
| 2019/0230556 | A1 * | 7/2019 | Lee | H04W 28/16 |
| 2019/0313359 | A1 * | 10/2019 | Lee | H04W 4/40 |
| 2020/0092380 | A1 * | 3/2020 | Lee | H04W 76/10 |
| 2020/0137675 | A1 * | 4/2020 | Park | H04W 68/005 |
| 2020/0267785 | A1 * | 8/2020 | Talebi Fard | H04W 40/248 |
| 2020/0305118 | A1 * | 9/2020 | Ryu | H04W 76/10 |
| 2021/0282103 | A1 * | 9/2021 | Zhu | H04W 76/15 |
| 2021/0321325 | A1 * | 10/2021 | Srivastava | H04L 67/1034 |
| 2021/0352619 | A1 * | 11/2021 | Ryu | H04W 68/02 |
| 2021/0410107 | A1 * | 12/2021 | Park | H04W 68/02 |
| 2022/0240173 | A1 * | 7/2022 | Wang | H04W 48/18 |
| 2022/0240213 | A1 * | 7/2022 | Ly | H04W 4/14 |
| 2022/0369215 | A1 * | 11/2022 | Dees | H04W 76/14 |
| 2022/0369221 | A1 * | 11/2022 | Pateromichelakis | |
| | | | | H04L 41/0806 |
| 2023/0013118 | A1 * | 1/2023 | Sharma | H04W 48/18 |
| 2023/0180085 | A1 * | 6/2023 | Thiebaut | H04W 36/0016 |
| | | | | 370/331 |
| 2023/0319528 | A1 * | 10/2023 | Pateromichelakis | H04W 4/44 |
| | | | | 455/420 |

FOREIGN PATENT DOCUMENTS

| | | |
|---|---|---|
| CN | 111373792 A | 7/2020 |
| WO | 2019229219 A1 | 12/2019 |
| WO | 2019235984 A1 | 12/2019 |

OTHER PUBLICATIONS

Author Unknown, "5G; Procedures for the 5G System (5GS)," Technical Specification 123.502, Version 16.5.0, Jul. 2020, ETSI, 597 pages.

CATT, "R3-205361: Discussion on NG based handover slice re-mapping," 3GPP TSG-RAN WG3 #109-e, Aug. 17-28, 2020, Electronic Meeting, 2 pages.

Ericsson, "R3-205030: Discussion on slice Re-mapping at mobility," 3GPP TSG-RAN WG3 #109-e, Aug. 17-28, 2020, Electronic Meeting, 6 pages.

Qualcomm Incorporated, "R3-204807: Service Continuity when a slice becomes unavailable," 3GPP TSG-RAN WG3 Meeting#109-e, Aug. 17-28, 2020, Electronic Meeting, 3 pages.

Samsung, "R3-205404: Discussion on slice re-mapping," 3GPP TSG-RAN3 Meeting #109-e, Aug. 17-28, 2020, Electronic Meeting, 8 pages.

International Search Report and Written Opinion for International Patent Application No. PCT/IB2020/059066, mailed Jun. 23, 2021, 18 pages.

Notification to Grant for Chinese Patent Application No. 202080105573. 4, mailed Feb. 18, 2025, 6 pages.

Nokia, et al., "R3-205730: Summary of Offline Discussion on Sicing Solutions," 3GPP TSG-RAN WG3 #109, Aug. 17-27, 2020, Electronic Meeting, 16 pages.

First Office Action for Chinese Patent Application No. 202080105573. 4, mailed Oct. 31, 2024, 11 pages.

* cited by examiner

NETWORK-INITIATED SLICE-BASED SESSION HANDOVER

This application is a 35 U.S.C. § 371 national phase filing of International Application No. PCT/IB2020/059066, filed Sep. 28, 2020, the disclosure of which is incorporated herein by reference in its entirety.

TECHNICAL FIELD

The present disclosure relates to session handover in a cellular communications system and, in particular, to session handover in a cellular communications system that supports network slicing.

BACKGROUND

Network slicing utilizes virtualization technology (e.g., Software Defined Networking (SDN) and Network Functions Virtualization (NFV)) to allow multiple virtual (i.e., logical) networks to be created on top of a common shared physical infrastructure. These virtual networks are referred to as network slices. The network slices can then be customized to meet needs of different use cases.

Network slicing has been proposed in the Third Generation Partnership Project (3GPP) for the Fifth Generation System (5GS). Network slicing in the 5GS results in many new features that can be provided by the 5GS but yet result in challenges when implementing those features using network slicing using existing 5GS mechanisms.

SUMMARY

Systems and methods are disclosed herein for network-initiated slice-based handover in a cellular communications system. In one embodiment, a method for network slice handover in a cellular communications system comprises, at a network node in a core network of the cellular communications system, detecting a triggering event for a network slice handover for a session of a particular wireless communication device. The method further comprises, at the network node and responsive to detecting the triggering event for the network slice handover, identifying a target network slice for the network slice handover for the session of the particular wireless communication device and sending, to a Policy and Control Function (PCF) in the core network, a message that initiates a network slice handover of the session of the particular wireless communication device from a source network slice to the target network slice. The method further comprises, at the PCF, receiving, from the network node, the message that initiates the network slice handover of the session of the particular wireless communication device from the source network slice to the target network slice and performing an action to cause the network slice handover of the session of the particular wireless communication device from the source network slice to the target network slice. In this manner, handover of sessions between network slices can be provided.

In one embodiment, the message that initiates the network slice handover comprises information that identifies the target network slice. In one embodiment, the information that identifies the target network slice is a Subscribed Network Slice Selection Assistance Information (S-NSSAI) of the target network slice.

In one embodiment, performing the action to cause the network slice handover comprises sending, to a Session Management Function (SMF) in the core network, a request to replace the session of the particular wireless communication device which uses the source network slice with a new session that uses the target network slice. In one embodiment, the request comprises information that identifies the target network slice. In one embodiment, the information that identifies the target network slice is an S-NSSAI of the target network slice. In one embodiment, the method further comprises, at the SMF, receiving the request to replace the session of the particular wireless communication device which uses the source network slice with the new session that uses the target network slice and sending, to the particular wireless communication device via an Access and Mobility Function (AMF) in the core network, an instruction to replace the session which uses the source network slice with the new session that uses the target network slice. In one embodiment, the instruction is an instruction that triggers the wireless communication device to initiate a session establishment by which the new session is established over the target network slice. In one embodiment, the instruction comprises information that identifies the target network slice. In one embodiment, the information that identifies the target network slice is an S-NSSAI of the target network slice. In one embodiment, the instruction comprises information that indicates a reason for the instruction to replace the session which uses the source network slice with the new session that uses the target network slice. In one embodiment, the instruction comprises information that indicates an amount of time that the new session is permitted to use the target network slice.

In one embodiment, the method further comprises, at the wireless communication device, receiving the instruction to replace the session which uses the source network slice with the new session that uses the target network slice and, responsive to the instruction, initiating a procedure to establish the new session using the target network slice. In one embodiment, the method further comprises, at the wireless communication device, presenting a notification about the network slice handover, the notification being an audio notification, a visual notification, or an audio-visual notification.

In one embodiment, the triggering event for the network slice handover is based on: (a) a location of the particular wireless communication device, (b) a location or area associated to the source network slice, (c) a location or area associated to the target network slice, (d) payment related information, or (e) a combination of (a) and a combination of any two or more of (b) and (d).

In one embodiment, the triggering event for the network slice handover is a time-based triggering event.

In one embodiment, the source network slice is associated to a first Subscriber Identity Module (SIM) of the wireless communication device, the target network slice is associated to a second SIM of the wireless communication device, and the first and second SIMs are associated to a same network operator.

In one embodiment, the network node is a Unified Data Management function (UDM).

Corresponding embodiments of a cellular communications system are also disclosed. In one embodiment, a cellular communications system comprises a network node in a core network of the cellular communications system, wherein the network node is adapted to detect a triggering event for a network slice handover for a session of a particular wireless communication device. The network node is further adapted to, responsive to detecting the triggering event for the network slice handover, identify a target network slice for the network slice handover for the session of the particular wireless communication device and sending, to a PCF in the core network, a message that initiates a network slice handover of the session of the particular wireless communication device from a source network slice to the target network slice. The network node is further adapted to, at the PCF, receive, from the network node, the message that initiates the network slice handover of the session of the particular wireless communication device from the source network slice to the target network slice and perform an action to cause the network slice handover of the session of the particular wireless communication device from the source network slice to the target network slice.

Embodiments of a method of operation of a network node in a core network of a cellular communications system for network slice handover are also disclosed. In one embodiment, the method of operation of the network node comprises detecting a triggering event for a network slice handover for a session of a particular wireless communication device. The method further comprises, responsive to detecting the triggering event for the network slice handover, identifying a target network slice for the network slice handover for the session of the particular wireless communication device and performing an action that initiates a network slice handover of the session of the particular wireless communication device from a source network slice to the target network slice.

In one embodiment, performing the action comprises sending, to a PCF in the core network, a message that initiates a network slice handover of the session of the particular wireless communication device from a source network slice to the target network slice.

In one embodiment, the message that initiates the network slice handover comprises information that identifies the target network slice. In one embodiment, the information that identifies the target network slice is an S-NSSAI of the target network slice.

In one embodiment, the source network slice is associated to a first SIM of the wireless communication device, the target network slice is associated to a second SIM of the wireless communication device, and the first and second SIMs are associated to a same network operator.

In one embodiment, the network node is a UDM. In another embodiment, the network node is a PCF.

Corresponding embodiments of a network node for a core network of a cellular communications system for network slice handover are also disclosed. In one embodiment, the network node is adapted to detect a triggering event for a network slice handover for a session of a particular wireless communication device. The network node is further adapted to responsive to detecting the triggering event for the network slice handover, identify a target network slice for the network slice handover for the session of the particular wireless communication device and send, to a PCF in the core network, a message that initiates a network slice handover of the session of the particular wireless communication device from a source network slice to the target network slice.

In one embodiment, a physical infrastructure node for implementing a network node for a core network of a cellular communications system for network slice handover comprises processing circuitry configured to cause the physical infrastructure node to detect a triggering event for a network slice handover for a session of a particular wireless communication device. The processing circuitry is further configured to cause the physical infrastructure node to, responsive to detecting the triggering event for the network slice handover, identify a target network slice for the network slice handover for the session of the particular wireless communication device and send, to a PCF in the core network, a message that initiates a network slice handover of the session of the particular wireless communication device from a source network slice to the target network slice.

Embodiments of a method of operation of a PCF for a core network of a cellular communications system for network slice handover are also disclosed. In one embodiment, the method of operation of the PCF comprises receiving, from a network node, a message that initiates a network slice handover of a session of a particular wireless communication device from a source network slice to a target network slice. The method further comprises performing an action to cause the network slice handover of the session of the particular wireless communication device from the source network slice to the target network slice.

In one embodiment, the message that initiates the network slice handover comprises information that identifies the target network slice. In one embodiment, the information that identifies the target network slice is an S-NSSAI of the target network slice.

In one embodiment, performing the action to cause the network slice handover comprises sending, to a SMF in the core network, a request to replace the session of the particular wireless communication device which uses the source network slice with a new session that uses the target network slice. In one embodiment, the request comprises information that identifies the target network slice. In one embodiment, the information that identifies the target network slice is an S-NSSAI of the target network slice.

In one embodiment, the source network slice is associated to a first SIM of the wireless communication device, the target network slice is associated to a second SIM of the wireless communication device, and the first and second SIMs are associated to a same network operator.

In one embodiment, the network node is a UDM.

Corresponding embodiments of a PCF are also disclosed. In one embodiment, a PCF for a core network of a cellular communications system for network slice handover is adapted to receive, from a network node, a message that initiates a network slice handover of a session of a particular wireless communication device from a source network slice to a target network slice. The PCF is further adapted to perform an action to cause the network slice handover of the session of the particular wireless communication device from the source network slice to the target network slice.

Corresponding embodiments of a physical infrastructure node for implementing a PCF for a core network of a cellular communications system for network slice handover comprises a network interface and processing circuitry associated with the network interface. The processing circuitry is configured to cause the physical infrastructure node to receive, from a network node, a message that initiates a network slice handover of a session of a particular wireless communication device from a source network slice to a target network slice and perform an action to cause the network slice handover of the session of the particular wireless communication device from the source network slice to the target network slice.

Embodiments of a method of operation of a SMF for a core network of a cellular communications system are also disclosed. In one embodiment, the method of operation of the SMF includes receiving, from a PCF in the core network, a request to replace a session of a particular wireless communication device which uses a source network slice with a new session that uses a target network slice and sending, to the particular wireless communication device via an Access and Mobility Function (AMF) in the core network, an instruction to replace the session which uses the source network slice with the new session that uses the target network slice.

In one embodiment, the request comprises information that identifies the target network slice. In one embodiment, the information that identifies the target network slice is an S-NSSAI of the target network slice.

In one embodiment, the instruction is an instruction that triggers the wireless communication device to initiate a session establishment by which the new session is established over the target network slice.

In one embodiment, the instruction comprises information that identifies the target network slice. In one embodiment, the information that identifies the target network slice is an S-NSSAI of the target network slice.

In one embodiment, the instruction comprises information that indicates a reason for the instruction to replace the session which uses the source network slice with the new session that uses the target network slice.

In one embodiment, the instruction comprises information that indicates an amount of time that the new session is permitted to use the target network slice.

In one embodiment, the source network slice is associated to a first SIM of the wireless communication device, the target network slice is associated to a second SIM of the wireless communication device, and the first and second SIMs are associated to a same network operator.

Corresponding embodiments of an SMF are also disclosed. In one embodiment, an SMF is adapted to receive, from a PCF in the core network, a request to replace a session of a particular wireless communication device which uses a source network slice with a new session that uses a target network slice and send, to the particular wireless communication device via an AMF in the core network, an instruction to replace the session which uses the source network slice with the new session that uses the target network slice.

Corresponding embodiments of a physical infrastructure node for implementing a SMF for a core network of a cellular communications system for network slice handover comprises a network interface and processing circuitry associated with the network interface. The processing circuitry is configured to cause the physical infrastructure node to receive, from a PCF in the core network, a request to replace a session of a particular wireless communication device which uses a source network slice with a new session that uses a target network slice and send, to the particular wireless communication device via an AMF in the core network, an instruction to replace the session which uses the source network slice with the new session that uses the target network slice.

Embodiments of a method of operation of a wireless communication device for network slice handover in a cellular communications system are also disclosed. In one embodiment, the method of operation of the wireless communication device comprises receiving, from a network node in a core network of the cellular communications system, an instruction to replace a current session of the wireless communication device which uses a source network slice with a new session that uses a target network slice. The method further comprises, responsive to the instruction, initiating a procedure to establish the new session using the target network slice.

In one embodiment, the instruction comprises information that identifies the target network slice. In one embodiment, the information that identifies the target network slice is an S-NSSAI of the target network slice.

In one embodiment, the instruction comprises information that indicates a reason for the instruction to replace the session which uses the source network slice with the new session that uses the target network slice.

In one embodiment, the instruction comprises information that indicates an amount of time that the new session is permitted to use the target network slice.

In one embodiment, the method further comprises presenting a notification about a network slice handover from the source network slice to the target network slice, the notification being an audio notification, a visual notification, or an audio-visual notification.

In one embodiment, the source network slice is associated to a first SIM of the wireless communication device, the target network slice is associated to a second SIM of the wireless communication device, and the first and second SIMs are associated to a same network operator.

Corresponding embodiments of a wireless communication device are also disclosed. In one embodiment, a wireless communication device for network slice handover in a cellular communications system is adapted to receive, from a network node in a core network of the cellular communications system, an instruction to replace a current session of the wireless communication device which uses a source network slice with a new session that uses a target network slice and, responsive to the instruction, initiate a procedure to establish the new session using the target network slice.

In one embodiment, a wireless communication device for network slice handover in a cellular communications system comprises one or more transmitters, one or more receivers, and processing circuitry associated with the one or more transmitters and the one or more receivers. The processing circuitry configured to cause the wireless communication device to receive, from a network node in a core network of the cellular communications system, an instruction to replace a current session of the wireless communication device which uses a source network slice with a new session that uses a target network slice and, responsive to the instruction, initiate a procedure to establish the new session using the target network slice.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
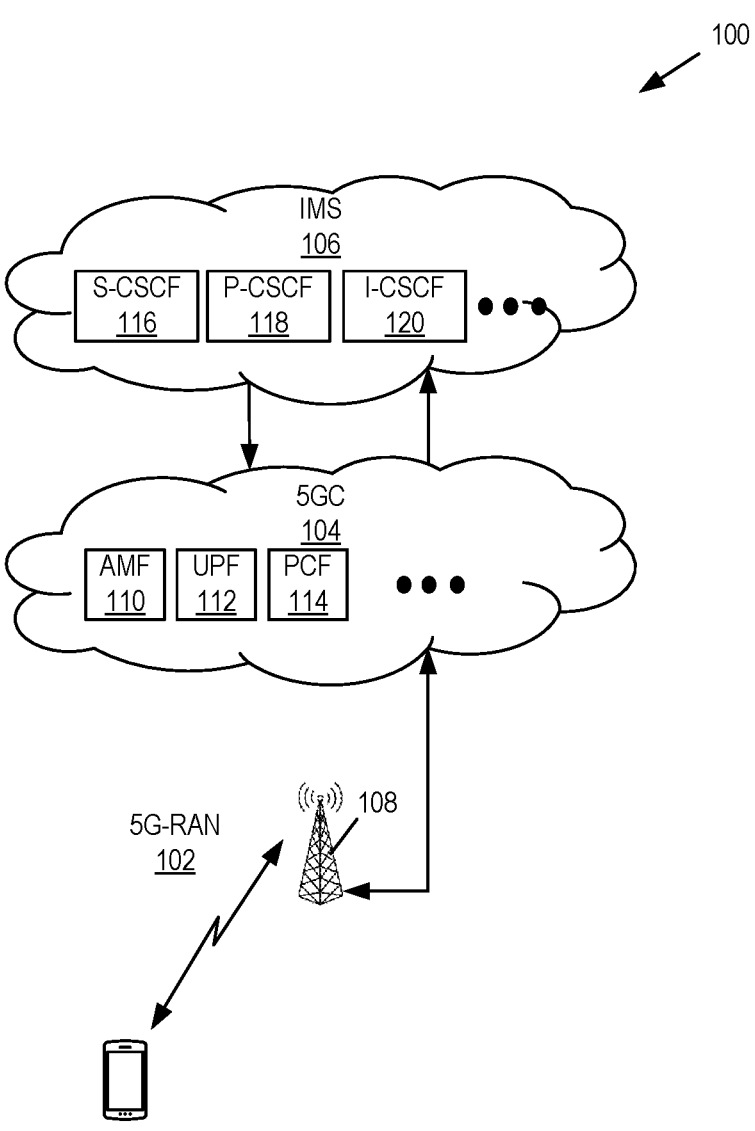
FIG. 1 illustrates an example of a system including a Fifth Generation System (5GS) and an IMS.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein for network-initiated network slice handover of a session of a particular wireless communication device (e.g., a UE) in a cellular communications system. In the following description, the cellular communications system is the 5GS; however, the solution described herein can be used in other types of cellular or wireless communications systems that support network slicing.

The need for network-initiated slice handover can be illustrated by the following non-limiting use cases.

Use Case 1: Call handover between Network Slices.

In shopping malls, users (i.e., customers) like to move from shop to shop to view and potentially purchase products at different stores. Store operators or owners in such locations desire for customers to make purchases. In order to encourage customers to do so, store operators or owners offer various on-spot offers to attract more and more customers to increase their chances of a purchase at their stores.

It is envisioned that such business operators or owners in 5G ecosystem may like to buy or lease network slices from network operators in order to attract customers to their stores, to serve their customers, or to enhance customer experience for customers already present at their stores. Network slices may be associated to or be used to provide one or more services such as, for example, free streaming of product videos or on-spot offers. Such network slices are location bound as different stores may be associated to different network slices, where these network slices are bounded to the locations of the respective stores. In other words, customers may only be allowed to access these network slices when located at the respective stores.

Consider a customer who is moving inside such a mall from store to store, where network slices bought or leased by the store operators or owners are getting assigned and unassigned as the customer leaves the boundary of one store and enters the boundary of another store. The customer may, for example, use the service (e.g., a voice service) offered by a network slice of a particular store to make a voice call.

It is known that a service disconnects when there is a network slice change. That is, a moving user (customer) who is browsing products from store to store and at the same time makes a call using service of a network slice associated to the location of a particular store. As the user moves, it is quite possible that the voice call disconnects as the user moves from one network slice to another.

Now, in order to protect end customer's experience, such stores offering area bound network slices to their customers may like to a call handover mechanism that allows calls to handover between such area bound network slices that are offered by the stores as customers move inside a mall from store to store to avoid frequent call disconnections.

Use Case 2: Beep indication during an ongoing voice call on approaching the slice boundary.

Consider businesses locations, like an airport lounge, where a user waits for some purpose and, while waiting, uses services offered at that location. Consider a case where there is a network slice that is bound to that location and/or has time-bound (e.g., has a time restriction) as per businesses/verticals, and a service (e.g. voice) is offered via that network slice. A user (or customer) waiting at that lounge may, for example, make a call using that service. As the user moves around and reaches the location boundary of the network slice (e.g., a location boundary of that geographic area in which the network slice is accessible), it would be desirable to provide a "beep indication" to the user during an ongoing voice call to alert the user that the call will be dropped if the user crosses the network slice boundary.

Use Case 3: In an ecosystem in which services offered as part of a network slice assigned to SIM, there may be a desire for a call handover from the network slice of one SIM to a network slice of another SIM in a multi-SIM UE. Here, both SIMs are offered by the same network operator.

As an example, consider SIMs (SIM1 and SIM2) having different subscription plans where a call is established using a network slice of SIM1 offered by an operator. In this case, it is desirable for there to be a network slice handover from the network slice of SIM1 to the network slice of SIM2 of the same network operator when the user's subscription for SIM1 is at low account balance, e.g., in order to avoid voice call disconnection. Handover from the network slice of SIM1 to the network slice of SIM2 of the same operator can also happen when the user's subscription for SIM1 has exhausted its approved data limits, e.g., in order to avoid over-the-top (OTT) call disconnection.

Now, before describing embodiments of the present disclosure, a brief description of network slicing in the 5GS and, in particular the 5GC (i.e., 5GC network slicing), is beneficial. In this regard, FIG. 1 illustrates an example of a system 100 including a 5G Radio Access Network (RAN) 102, a 5G Core Network (5GC) 104, and optionally an Internet Protocol (IP) Multimedia Subsystem (IMS) 106. Together, the 5G RAN 102 and the 5GC 104 are referred to as a 5GS. As illustrated, the 5G RAN 102 includes a number of radio access nodes 108 (referred to as New Radio (NR) base stations (gNBs)). The 5GC 104 includes a number of core network nodes, or core network functions, such as, e.g., an Access and Mobility Function(s) (AMF(s)) 110, a User Plane Function(s) (UPF(s)) 112, a Policy Control Function (s) (PCF(s)) 114, etc. The IMS 106 includes a number of IMS nodes such as, e.g., a Serving Call Session Control Function(s) (S-CSCF(s)) 116, a Proxy Call Session Control Function(s) (P-CSCF(s)) 118, I-CSCF(s) 120, etc.

Figure 2:
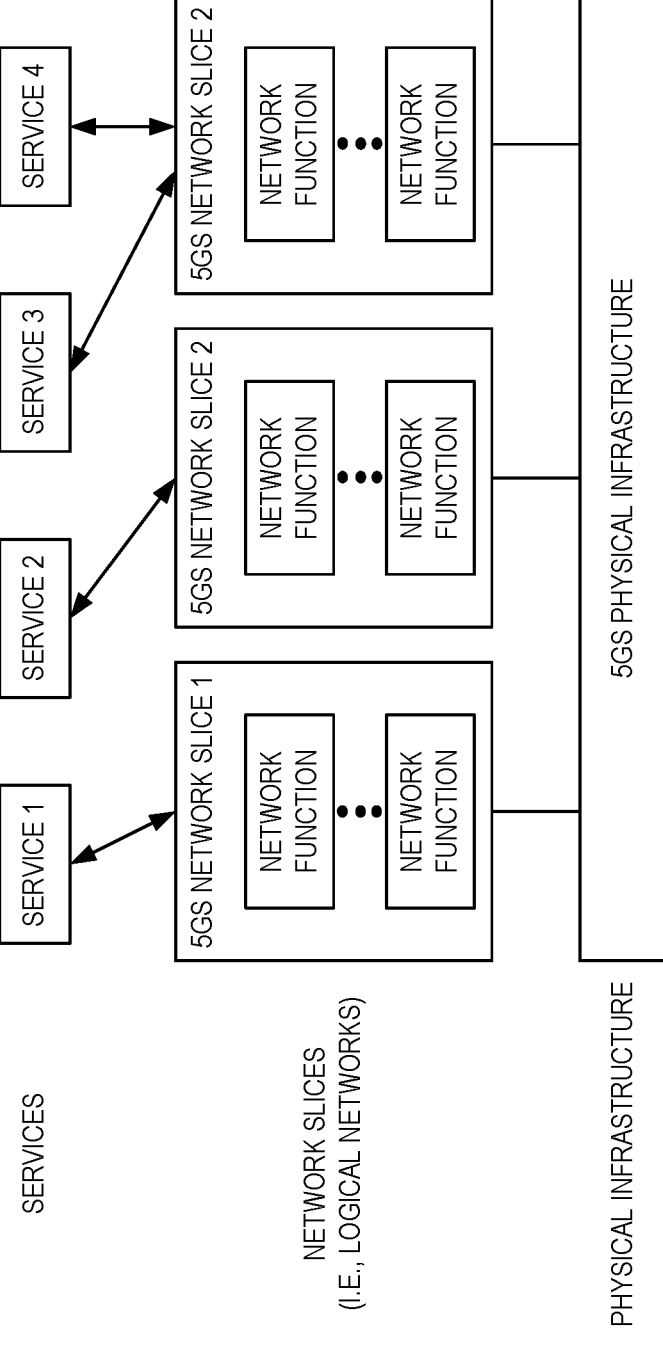
FIG. 2 illustrates network slicing within the 5GS.

FIG. 2 illustrates the concept of 5GC network slicing. As shown in FIG. 2, the 5GS supports multiple services. In this example, there are four services labelled as Service 1, Service 2, Service 3, and Service 4. Example services include, but are not limited to, enhanced Mobile Broadband (eMBB) service(s), Ultra Reliable Low Latency Communication (URLLC) service(s), massive Machine Type Communication (mMTC) service(s), massive Internet of Things (IoT) service(s), emergency service(s), and/or the like. Further examples of services are location-bound services (e.g., eMBB service provided in an Airport lobby), time-bound services (e.g., eMBB service provided by an operator of a store for a limited amount of time and possibly in predefined area or location such as, e.g., in the store, or the like. As shown, each of the services is mapped to a 5GC network slice that is customized to meet the needs of that service. Note that more than one service may be mapped to the same 5GC network slice. As also illustrated in FIG. 2, the 5GC network slices are implemented on the same physical infrastructure.

It should also be noted that, in some use cases in which the network-initiated network slice handover described herein, one or more of the 5GS network slices may be location-bound and/or time-bound and/or have other restrictions defined by the network operator and/or provider of the associated service(s) (e.g., a restriction on the amount of data that can be consumed by a UE while connected to the network slice, a restriction on the number of UEs that can be connected to the network slice, a restriction on the number of PDU sessions that can be active on the network slice at any one time, or the like).

Figure 3:
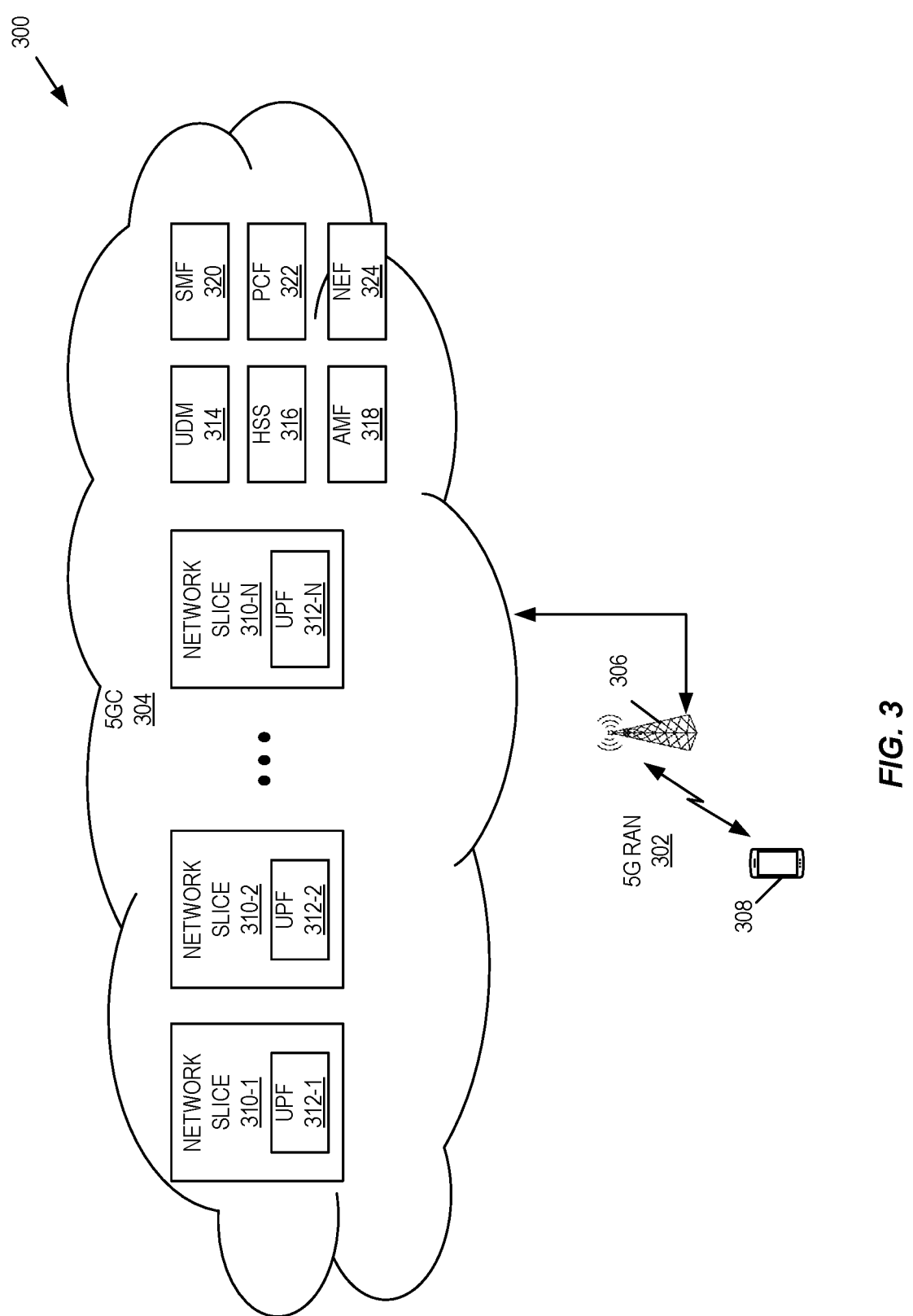
FIG. 3 illustrates one example of a wireless communication system in which embodiments of the present disclosure may be implemented.

In this regard, FIG. 3 illustrates an example of a cellular communications system 300 in which embodiments of a network-initiated slice handover can be implemented. In this example, the cellular communications system 300 is a 5GS; however, the embodiments disclosed herein are not limited thereto. As illustrated, the 5GS 300 includes a 5G RAN 302 (also referred to herein as a NR RAN or Next Generation RAN (NG-RAN)) and a 5GC 304. The 5G RAN 302 includes base stations 306 (i.e., gNBs and/or ng-eNBs) providing radio access to UEs 308. Network slicing is utilized in the 5GC 304 such that, in this example, the 5GC 304 includes multiple network slices 310-1 through 310-N. An arbitrary network slice from among the network slices 310-1 through 310-N is denoted herein as a network slice 310-n. Each network slice 310-n includes its own set of NFs such as, for example, a UPF 312-n. In addition, the 5GC 304 may include NFs that are common for all network slices 310-1 through 310-N for common NFs. These NFs are referred to herein as common NFs and may include, for example, a UDM(s) 314, a HSS(s) 316, AMF(s) 318, a SMF(s) 320, PCF(s) 322, a NEF(s) 324, etc.

Systems and methods are described herein that enable network-initiated network slice handover in a system such as the example 5GS 300 of FIG. 3. At the network side, a network node determines that a triggering event for a network slice handover for a session of a particular UE 308 from one network slice, denoted herein as a source network slice 310-s, to a target network slice, denoted herein as a target network slice 310-t. The network node then initiates a slice handover of the session of the UE 308 from the source network slice 310-s to the target network slice 310-t. As described below, in one embodiment, the network node that determines that the triggering event has occurred and, in response, initiates the slice handover is the UDM 314. However, the network node is not limited thereto. As another example, the network node may be a PCF.

In one embodiment, the slice handover could be due to, for example, location constraints associated with the currently used network slice (i.e., the source network slice 310-s), due to expiry of a timer for the use of the currently used network slice, payment related information (e.g., move to a cheaper cost network slice due to, e.g., time of day or just general price reduction), or the like. The detection of the triggering event for the slice handover and/or the selection of the target network slice 310-*t* is, in some embodiments, based on factors such as information about the constraints or restrictions on at least a subset of the network slices 310-1 through 310-N that are purchased or leased by entities such as, for example, operators or owners of the associated locales in the case of location-bound network slices, service providers of the associated services in the case of, e.g., time-bound network slices, or the like. In another scenario, the network node that initiates the slice handover could be configured with one or more locations and specific network slices 310-*n* to be allocated only while the UE 308 is in these locations. This could be due to business agreement, for example, with a shopping mall and the stores in this mall. The incentive could be that when the users use the network slice 310-*n* associated to a particular store, the users will be informed of special discounts and other coupons of which they would otherwise not know.

In one embodiment, the network node (e.g., UDM 314) that determines that the triggering event has occurred and, in response, initiates the slice handover subscribes to one or more events from core NFs in the 5GC 304 to enable the network node to detect the triggering event for the slice handover.

Upon detecting the triggering event for the slice handover, the network node identifies the target network slice 310-*t* for the slice handover and, in one embodiment, generates or otherwise obtains corresponding USRP rules based on the selected target network slice 310-*t* for the slice handover. In one embodiment, the selected target network slice 310-*t* depends on the detected triggering event and information configured in network node (e.g., configured the UDM 314). The target network slice 310-*t* could, for example, be a network slice 310-*n* that the UE 308 already has in its subscription profile, a network slice 310-*n* that is identified based on the current location of the UE 308, or a network slice 310-*n* (referred to herein as a "temporary network slice") that provides a temporary service and is, e.g., allocated to the UE 308 until the UE 308 tears down the PDU session on the source network slice 310-*s*, which has expired for example. There can be a time limit associated with a temporary network slice, after which the PDU session on the temporary network slice is network released. Hence, there are some variants here that can be applied if a temporary network slice is selected to be the target network slice 310-*t* for the slice handover.

When the network node detects the triggering event for the slice handover, the network node checks if the UE 308 is still using the source network slice 310-*s* (e.g., checks if the UE SMF context still indicates that the UE 308 is using the source network slice 310-*s*) from which the PDU session of the UE 308 has to be handed over due to, e.g., timer expiry, current slice not allowed in existing location, or a new slice dictated by the current location. If so, network node initiates a procedure for establishing a new PDU session for the UE 308 that uses the target network slice 310-*t*. Once the new PDU is session using the target network slice 310-*t* is successfully established, the old PDU session on the source network slice 310-*s* is preferably deleted. This matches Session and Service Continuity (SSC) mode 3, make before break. Hence there is no disruption to the UE activity.

To establish the new PDU session using the target network slice 310-*t*, the network node initiates a request to the PCF 322 for that purpose. The request includes information that identifies the target network slice 310-*t* (e.g., the S-NS-SAI of the target network slice 310-*t*) to be used and information that identifies the impacted PDU session (i.e., the PDU session of the UE 308 on the source network slice 310-*s*). The PCF 322 in turn interacts with the SMF 320 to request establishment of the new PDU session on the target network slice 310-*t*.

The SMF 320 supports a new procedure to perform the network slice handover in accordance with, in this example, SSC mode 3. In one embodiment, this procedure follows the same logic as the one depicted in section 4.3.5.2 in 3GPP TS 23.502 V16.5.0 "Change of SSC mode 3 PDU Session Anchor with multiple PDU Sessions." Although the input parameters are different, as will be explained in detail below.

Embodiments of the solution described herein may provide one or more of the following advantages. Embodiments of the solution described herein may provide call handover between network slices and, optionally, beep indication to callers during an ongoing voice call, web surfing, or even in IDLE state, on approaching a boundary of a geographic area associated to the respective network slice. Further, the binding of a network slice to time restrictions or constraints, location restrictions or constraints, and/or other relevant variables is an important enabler and will open new revenue opportunities for 5G network operators, support new use cases, etc. Business owners and operators can, for example, purchase or lease location-bound or time-bound network slices from network operators and, in turn, offer services via these network slices to their potential customers visiting their stores. These services may include services that enhance customer communication service (e.g. a voice call) experience by incorporating call handover between area bound network slices as customers move from one location to another (e.g., from the store of one business owner/operator to the store of another business owner/operator). These services may also include giving the beep or another type of indication to alert the caller on approaching a boundary of a location-bound network slice offered by a business owner/operator. In some embodiments, customers can ask for these services directly from operators giving a possibility of alternative revenue stream option to operators. Also, call handover between network slices and/or beep indication on reaching a boundary of a location-bound network slice will find huge reach across the world.

Figure 4A:
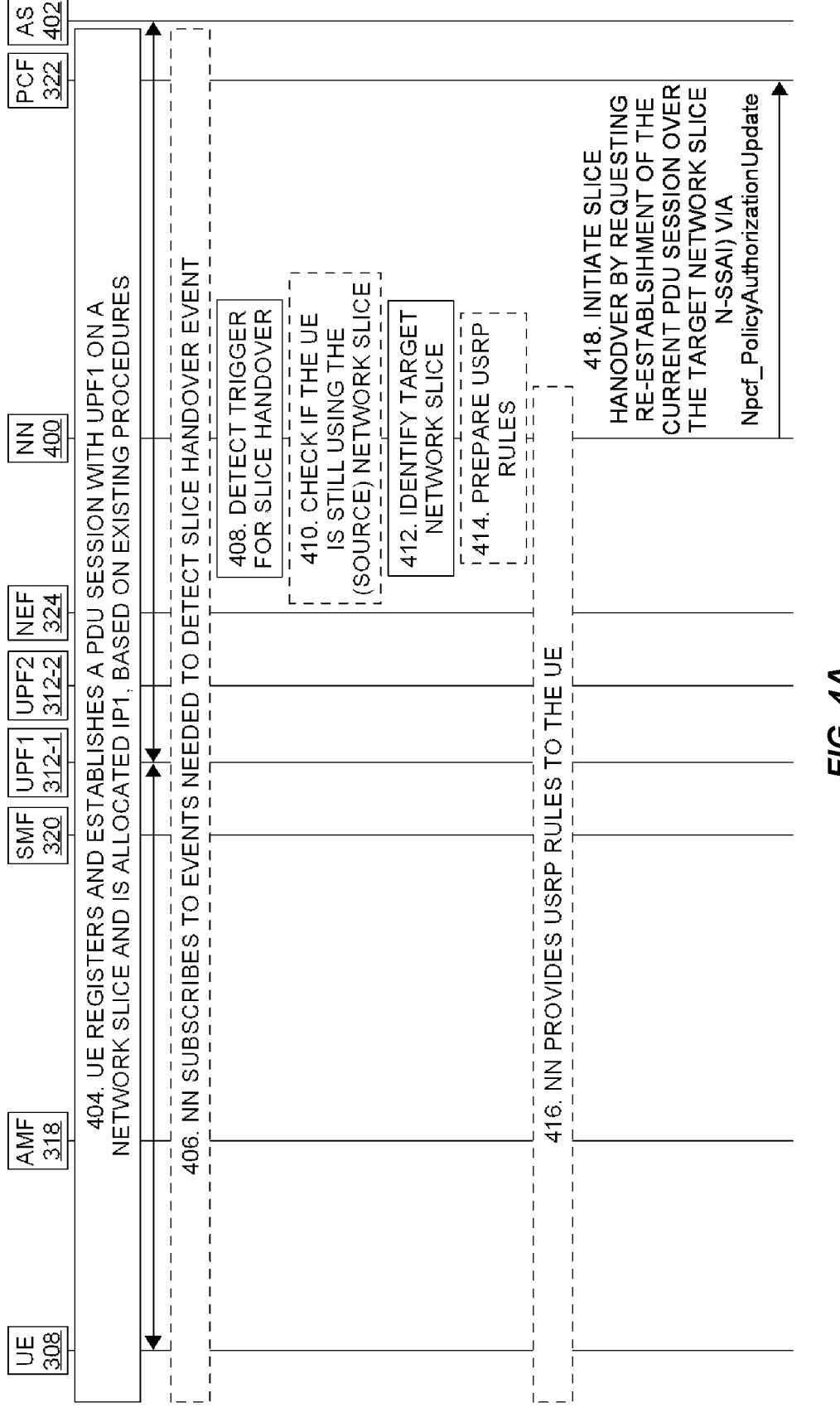
FIGS. 4A and 4B illustrate a network-initiated slice handover procedure in accordance with one embodiment of the present disclosure.
Figure 4B:
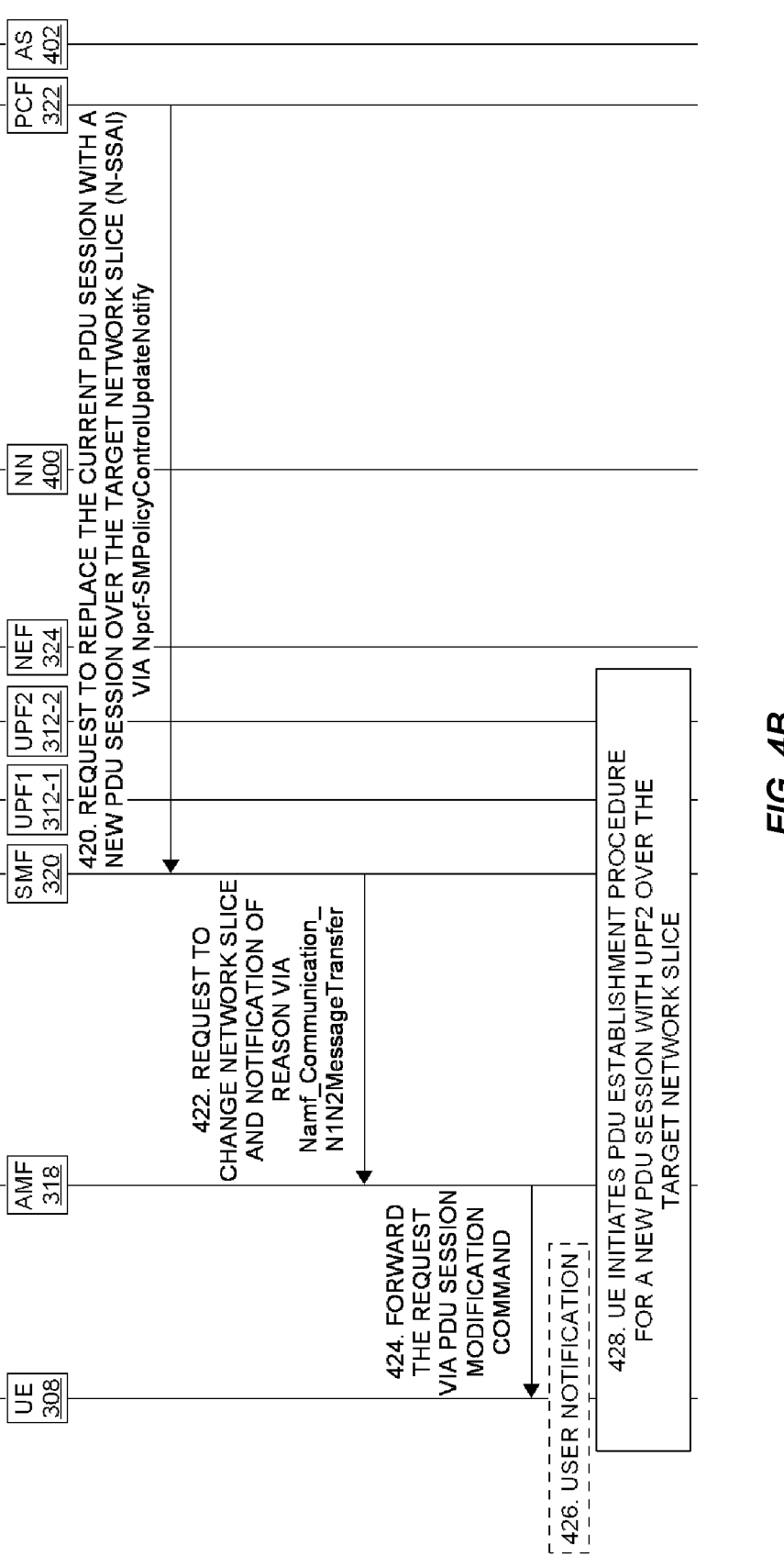

FIGS. 4A and 4B and FIGS. 5A and 5B illustrate exemplary procedures that implement embodiments of the solution described above. In particular, FIGS. 4A and 4B illustrate the operation of the 5GS 300 to perform a network-initiated slice handover procedure in accordance with one embodiment of the present disclosure. Optional steps are represented by dashed lines or dashed boxes. In this embodiment, the slice handover is initiated by a network node 400 in the 5GC 304.

As illustrated, the UE 308 registers in the 5GS 400 and establishes a PDU session based on existing procedures in 3GPP TS 23.502 (step 404). The PDU session is established, in this example, over a particular network slice, which for the purposes of the following slice handover procedure is referred to as the source network slice 310-*s*. The UPF 312-*n* of the source network slice 310-*s* is referred to herein as the UPF 312-*s* of the source network slice 310-*s*. The PDU session established in step 400 could be an IMS PDU session or any session towards any DNN for which the UE 308 has a subscription. During or in association with the PDU session establishment procedure, the UE 308 is allocated an IP address, denoted as IP1. Using the established PDU session, the UE 308 communicates with an AS 402. During the PDU session establishment procedure, if there is a condition associated to the use of the source network slice 310-*s*, this condition is recorded by, e.g., the network node 400, e.g., in association with the UE 308, e.g., in a specific context created for that purpose. The condition will be applicable to the DNN that the UE 308 is currently using. The condition, which is also referred to herein as a restriction or limitation for the source network slice 310-*s*, may be, for example, a time related condition, a location related condition, or the like. The network node 400 may also be configured with a network slice(s) 310-*n* to be used when a UE, such as the UE 308, enters a specific location(s), in which case this information will not be in the subscriber profile.

The network node 400 performs actions to be able to detect a triggering event(s) for a slice handover for the PDU session of the UE 308 from the source network slice 310-*s* to a target network slice. For example, the triggering event may be based on the condition obtained and stored for the source network slice 310-*s* during PDU session establishment or based on information configured in the network node 400 for the source network slice 310-*s* or potential target network slice(s). The action(s) performed by the network node 400 to be able to detect a triggering event(s) for a slice handover include, in this example, subscribing to event notifications for one or more related events from one or more NFs in the 5GC 304 (step 406). For example, for a location-based triggering event for slice handover, the network node 400 subscribes to the NEF 324 and to all appropriate AMFs 318 to be notified when the UE 308 leaves the location associated to the source network slice 310-*s* or enters in a relevant location of a potential target network slice. As another example, for a time-related triggering event for a slice handover, the network node 400 sets up a timer to be notified.

The network node 400 detects a triggering event for slice handover from the source network slice 310-*s* to another network slice 310-*n* (step 408). As discussed above, the triggering event may be, for example, location based, time based, or the like. Further, in one embodiment, the triggering event is related to the source network slice 310-*s*. For example, the triggering event may be that the UE 308 leaves a boundary of a location to which the source network slice 310-*s* is bound. In another embodiment, the triggering event is related to a specific target network slice 310-*t* to which handover is to be performed. For example, the triggering event may be that the UE 308 enters a boundary of a location to which a particular network slice 310-*n* is bound, in which case that particular network slice 310-*n* becomes the target network slice 310-*t* for the slice handover.

Optionally, the network node 400 determines whether the UE 308 is still using the source network slice 310-*s* (step 410). This may be done by checking the SMF context associated to the UE 308, which is accessible to the network node 400. If so, the network node 400 proceeds to initiate the slice handover.

In order to initiate the slice handover, the network node 400 identifies the target network slice 310-*t* for the slice handover (step 412) and corresponding UE Route Selection Policy (URSP) rules (step 414) and provides the URSP rules to the UE 308 (step 416). The target network slice 310-*t* may be a network slice 310-*n* that is already identified in the subscription profile of the UE 308, a network slice 310-*n* that bound to a current location of the UE 308, or a temporary network slice that is allocated to the UE 308 until the UE 308 tears down the PDU session on the source network slice 310-*s* and/or deregisters. There can be a time limit associated with the temporary network slice, after which the PDU session is network released. The URSP rules are provided to the UE 308 in step 416 using, e.g., existing procedures. Note that the UE 308 has to maintain the old context and the new context for the source and target network slices 310-*s* and 310-*t* until the slice handover is successfully completed, after which the UE 308 can delete any context specific to the source network slice 310-*s*, although this may not be strictly needed.

The network node 400 then performs actions to initiate or cause handover from the source network slice 310-*s* to the identified target network slice 310-*t*. As illustrated, the network node 400 sends a request to the PCF 322 to re-establish the PDU session of the UE 308 in the target network slice 310-*t* (step 418). More specifically, in this embodiment, the network node 400 triggers the service Npcf_PolicyAuthorizationUpdate to request the PCF 322 to update the policies for the PDU session of the UE 308 to move the PDU session to the target network slice 310-*t*, which may be identified by, for example, its S-NSSAI.

The PCF 322 sends a request to the SMF 320 via Npcf-SMPolicyControlUpdateNotify to replace the existing PDU session with a new PDU session using the target network slice 310-*t* (i.e., using the S-NSSAI of the target network slice 310-*t*) (step 420). The SMF 320 then initiates a procedure to establish the new PDU session and release the old PDU session (step 422). In one embodiment, this procedure is similar to that described in 3GPP TS 23.502 section 4.3.5.2 "Change of SSC mode 3 PDU Session Anchor with multiple PDU Sessions" with the following extensions. The SMF 320 instructs the UE 308 that a slice change is required and notifies the UE 308 of the reason for the slice change (steps 422 and 424). More specifically, in step 422, the SMF 320 sends, to the AMF 318, a request for a slice change to the target network slice 310-*t* and a notification of the reason for the change via Namf_Communication_N1N2MessageTransfer. In step 424, the AMF 318 forwards the request and notification of the reason for the slice change to the UE 308 via a PDU session modification command. Thus, the AMF 318 is aware of the slice change. The PDU session modification request informs the UE 308 of the target network slice 310-*t* (e.g., includes the S-NSSAI of the target network slice 310-*t*) and optionally indicates a life time for the new PDU session in the target network slice 310-*t*, which could optionally be presented to the user of the UE 308. If a life time is indicated, then the target network slice 310-*t* can be referred to herein as a temporary network slice. The life time is an amount of time that the new PDU session can be maintained on the target network slice 310-*t* before the new PDU session is terminated or handed over to another network slice.

In one embodiment, the UE 308 provides a notification to the user of the UE 308 about the slice change (step 426). For example, in one particular embodiment, the UE 308 displays a message to the user with an optional beep to notify the user of the slice change, the reason for the change, and optionally the life time of the new PDU session on the target network slice 310-*t*, if provided.

The UE 308 initiates a procedure to establish the new PDU session over the target network slice 310-*t* (step 428).

Note that the procedure above for establishing the new PDU session on the target network slice 310-*t* may or may not result in a change of the SMF 320. Whether a new SMF or the same SMF 320 is used, a new IP address is allocated to the UE 308 and used for the new PDU session.

Note that, for IMS PDU sessions, additional consideration is needed. In one embodiment, the IMS application indicates to the user of the UE 308 that the session will be put on hold to enable updating the remote end with the new IP address for the UE 308 (e.g., using SIP procedures for that purpose). Once the update is completed, the session resumes using the new IP address. In one embodiment, the UE 308 then releases the old session. This ensures minimal and graceful session disruption. Another option not involving session disruption at all is to not put the session is hold but rather handle the voice bits from the old session (old IP address) until such time as the remote UE is fully updated and started using the new session. There should not be voice interruption in this case, but the UE must be able to support this feature. In one embodiment, the IMS application initiates the release of the old session following a complete and successful transfer of the IMS PDN.

Once the slice handover is complete, the network node 400 may perform action(s) to detect further slice handover triggering events.

Figure 5A:
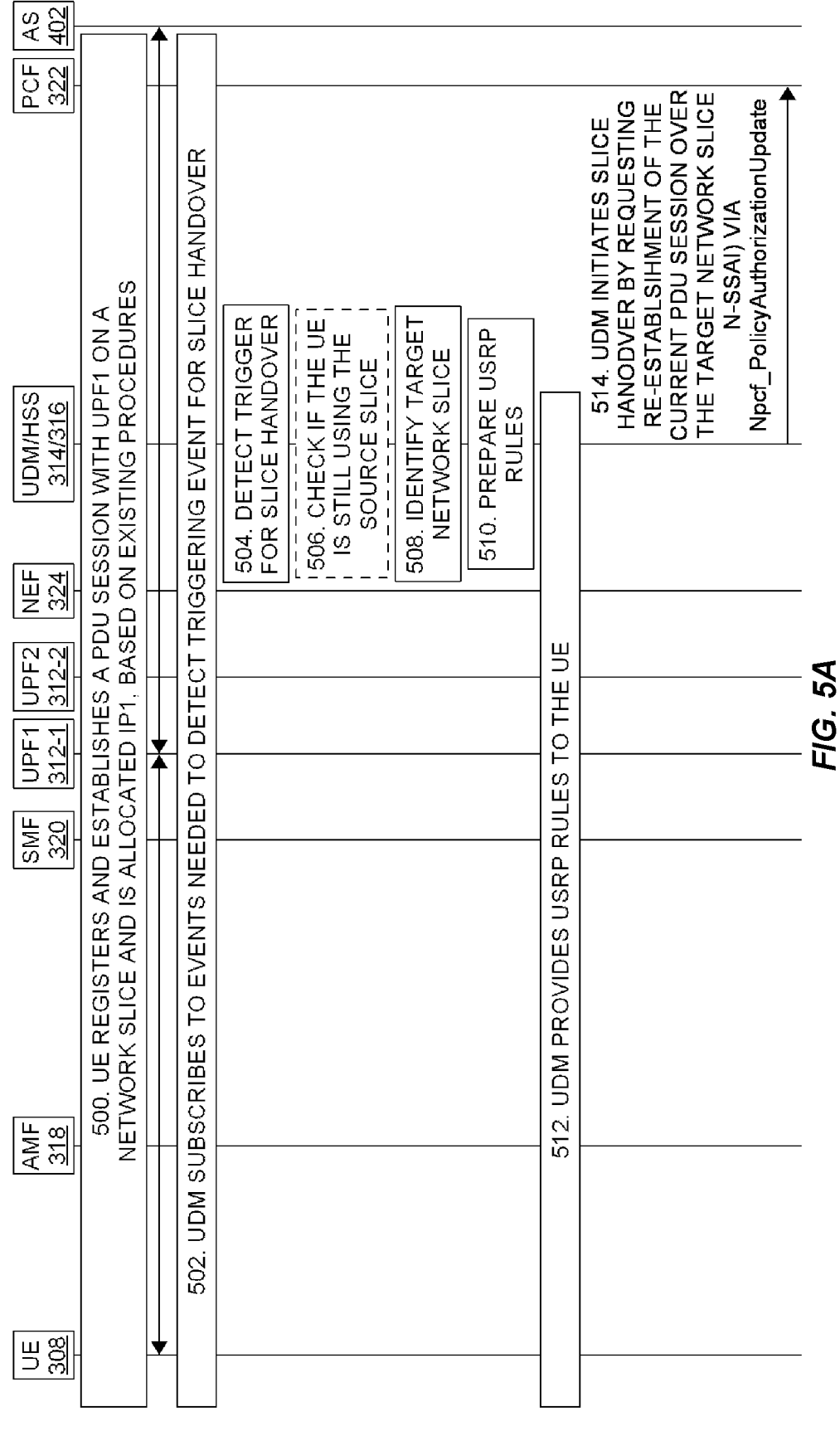
FIGS. 5A and 5B illustrate a network-initiated slice handover procedure in accordance with another embodiment of the present disclosure.
Figure 5B:
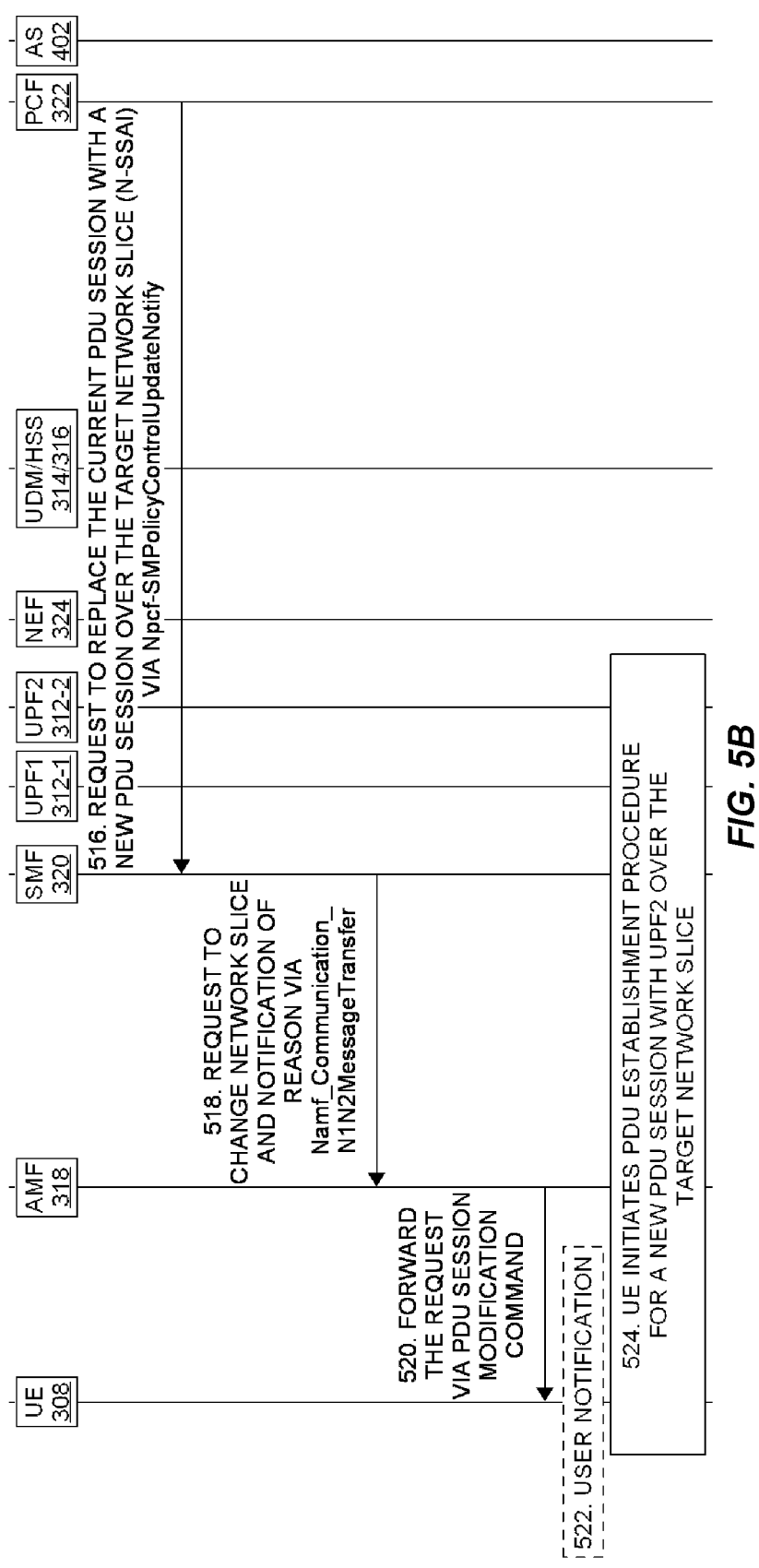

FIGS. 5A and 5B illustrate the operation of the 5GS 300 to perform a network-initiated slice handover procedure in accordance with one embodiment of the present disclosure. Optional steps are represented by dashed lines or dashed boxes. This embodiment is similar to that of FIGS. 4A and 4B but where the network node 400 that initiates the slice handover is the UDM 314.

As illustrated, the UE 308 registers in the 5GS 400 and establishes a PDU session based on existing procedures in 3GPP TS 23.502 (step 500). The PDU session is established, in this example, over a particular network slice, which for the purposes of the following slice handover procedure is referred to as the source network slice **310-*s*. The UPF 312-*n* of the source network slice 310-*s* is referred to herein as the UPF 312-*s* of the source network slice 310-*s*. The PDU session established in step 500 could be an IMS PDU session or any session towards any DNN for which the UE 308 has a subscription. During or in association with the PDU session establishment procedure, the UE 308 is allocated an IP address, denoted as IP1. Using the established PDU session, the UE 308 communicates with the AS 402. During the PDU session establishment procedure, if there is a condition associated to the use of the source network slice 310-*s*, this condition is recorded by the UDM 314 in the subscription profile of the UE 308, e.g., in a specific context created for that purpose. The condition will be applicable to the DNN that the UE 308 is currently using. The condition, which is also referred to herein as a restriction or limitation for the source network slice 310-*s*, may be, for example, a time related condition, a location related condition, or the like. The UDM 314 may also be configured with a network slice(s) 310-*n* to be used when a UE, such as the UE 308**, enters a specific location(s), in which case this information will not be in the subscriber profile.

The UDM 314 performs actions to be able to detect a triggering event(s) for a slice handover for the PDU session of the UE 308 from the source network slice **310-*s* to a target network slice. For example, the triggering event may be based on the condition obtained and stored for the source network slice 310-*s* during PDU session establishment or based on information configured in the UDM 314 for the source network slice 310-*s* or potential target network slice (s). The action(s) performed by the UDM 314 to be able to detect a triggering event(s) for a slice handover include, in this example, subscribing to event notifications for one or more related events from one or more NFs in the 5GC 304 (step 502). For example, for a location-based triggering event for slice handover, the UDM 314 subscribes to the NEF 324 and to all appropriate AMFs 318 to be notified when the UE 308 leaves the location associated to the source network slice 310-*s* or enters in a relevant location of a potential target network slice. As another example, for a time-related triggering event for a slice handover, the UDM 314** sets up a timer to be notified.

The UDM 314 detects a triggering event for slice handover from the source network slice **310-*s* to another network slice 310-*n* (step 504). As discussed above, the triggering event may be, for example, location based, time based, or the like. Further, in one embodiment, the triggering event is related to the source network slice 310-*s*. For example, the triggering event may be that the UE 308 leaves a boundary of a location to which the source network slice 310-*s* is bound. In another embodiment, the triggering event is related to a specific target network slice 310-*t* to which handover is to be performed. For example, the triggering event may be that the UE 308 enters a boundary of a location to which a particular network slice 310-*n* is bound, in which case that particular network slice 310-*n* becomes the target network slice 310-*t*** for the slice handover.

Optionally, the UDM 314 determines whether the UE 308 is still using the source network slice **310-*s* (step 506). This may be done by checking the SMF context associated to the UE 308, which is accessible to the UDM 314. If so, the UDM 314** proceeds to initiate the slice handover.

In order to initiate the slice handover, the UDM 314 identifies the target network slice **310-*t* for the slice handover (step 508) and corresponding UE Route Selection Policy (URSP) rules (step 510) and provides the URSP rules to the UE 308 (step 512). The target network slice 310-*t* may be a network slice 310-*n* that is already identified in the subscription profile of the UE 308, a network slice 310-*n* that bound to a current location of the UE 308, or a temporary network slice that is allocated to the UE 308 until the UE 308 tears down the PDU session on the source network slice 310-*s* and/or deregisters. There can be a time limit associated with the temporary network slice, after which the PDU session is network released. The URSP rules are provided to the UE 308 in step 512 using, e.g., existing procedures. Note that the UE 308 has to maintain the old context and the new context for the source and target network slices 310-*s* and 310-*t* until the slice handover is successfully completed, after which the UE 308 can delete any context specific to the source network slice 310-*s***, although this may not be strictly needed.

The UDM 314 then performs actions to initiate or cause handover from the source network slice **310-*s* to the identified target network slice 310-*t*. As illustrated, the UDM 314 sends a request to the PCF 322 to re-establish the PDU session of the UE 308 in the target network slice 310-*t* (step 514). More specifically, in this embodiment, the UDM 314 triggers the service Npcf_PolicyAuthorizationUpdate to request the PCF 322 to update the policies for the PDU session of the UE 308 to move the PDU session to the target network slice 310-*t***, which may be identified by, for example, its S-NSSAI.

The PCT 322 sends a request to the SMF 320 via Npcf-SMPolicyControlUpdateNotify to replace the existing PDU session with a new PDU session using the target network slice **310-*t* (i.e., using the S-NSSAI of the target network slice 310-*t*) (step 516). The SMF 320 then initiates a procedure to establish the new PDU session and release the old PDU session (step 518). In one embodiment, this procedure is similar to that described in 3GPP TS 23.502 section 4.3.5.2 "Change of SSC mode 3 PDU Session Anchor with multiple PDU Sessions" with the following extensions. The SMF 320 instructs the UE 308 that a slice change is required and notifies the UE 308 of the reason for the slice change (steps 518 and 520). More specifically, in step 518, the SMF 320 sends, to the AMF 318, a request for a slice change to the target network slice 310**-*t* and a notification of the reason for the change via Namf_Communication_N1N2MessageTransfer. In step 520, the AMF 318 forwards the request and notification of the reason for the slice change to the UE 308 via a PDU session modification command. Thus, the AMF 318 is aware of the slice change. The PDU session modification request informs the UE 308 of the target network slice 310-*t* (e.g., includes the S-NSSAI of the target network slice 310-*t*) and option- ally indicates a life time for the new PDU session in the target network slice 310-*t*, which could optionally be pre- sented to the user of the UE 308. If a life time is indicated, then the target network slice 310-*t* can be referred to herein as a temporary network slice. The life time is an amount of time that the new PDU session can be maintained on the target network slice 310-*t* before the new PDU session is terminated or handed over to another network slice.

In one embodiment, the UE 308 provides a notification to the user of the UE 308 about the slice change (step 522). For example, in one particular embodiment, the UE 308 displays a message to the user with an optional beep to notify the user of the slice change, the reason for the change, and optionally the life time of the new PDU session on the target network slice 310-*t*, if provided.

The UE 308 initiates a procedure to establish the new PDU session over the target network slice 310-*t* (step 524).

Note that the procedure above for establishing the new PDU session on the target network slice 310-*t* may or may not result in a change of the SMF 320. Whether a new SMF or the same SMF 320 is used, a new IP address is allocated to the UE 308 and used for the new PDU session.

Note that, for IMS PDU sessions, additional consideration is needed. In one embodiment, the IMS application indicates to the user of the UE 308 that the session will be put on hold to enable updating the remote end with the new IP address for the UE 308 (e.g., using SIP procedures for that purpose). Once the update is completed, the session resumes using the new IP address. In one embodiment, the UE 308 then clears the old session. This ensures minimal and graceful session disruption. Another option not involving session disruption at all is to not put the session is hold but rather handle the voice bits from the old session (old IP address) until such time as the remote UE is fully updated and started using the new session. There should not be voice interruption in this case, but the UE must be able to support this feature. In one embodiment, the IMS application initiates the clearance of the old session following a complete and successful transfer of the IMS PDN.

Once the slice handover is complete, the UDM 314 may perform action(s) to detect further slice handover triggering events.

The slice handover procedures described herein can be extended to slice handover between network slices associ- ated to different Subscriber Identity Modules (SIMs) within the same UE 308. In other words, in one embodiment, the UE 308 has two or more SIMs belonging to the same network operator and having separate subscriptions to the 5GS where slice handover is from a source network slice associated to one of the SIMs to a target network slice associated to a different one of the SIMs. In this case, the network node (e.g., network node 400 such as, e.g., the UDM 314) and the UE 308 perform coordination to ensure that the same SMF 320 is selected when the UE 308 uses the SIM associated to the target network slice (i.e., the "target SIM") for establishing the PDU session.

For network coordination, the network node 400 (e.g., the UDM 312) may provide the SMF identity (i.e., the identity of the SMF 320) to the AMF 318. The AMF 318 selects the SMF 320 to be used. In one embodiment, network coordi- nation (e.g., UDM coordination) is achieved either by updat- ing the UE subscription in the AMF 318 with the SMF identity to use in association with the DNN, if the UE 308 is already registered with the target SIM, or providing this information at registration when the UE 308 registers in the 5GC 304.

In one embodiment, UE coordination is established in two steps. This will be described in relation to the call flows of FIGS. 4A and 4B and FIGS. 5A and 5B. In steps 414 and 512 of the call flows, the URSP rules indicate that they apply to the target SIM. Hence, the UE 308 will maintain two contexts, one in the source SIM (i.e., the SIM associated to the source network slice) and one in the target SIM.

Next, in the procedure utilized from 3GPP TS 23.502, section 4.3.5.2 "Change of SSC mode 3 PDU Session Anchor with multiple PDU Sessions," the UE 308 is aware of the target SIM and the target S-NSSAI to use. This additional capability requires the inclusion of the target SIM, in addition to the capabilities needed to handle the slice handover within the same SIM. In one embodiment, this information is conveyed in the PDU session modification request 422 or 520. Now, the PDU session modification request further includes the target SIM.

Figure 6:
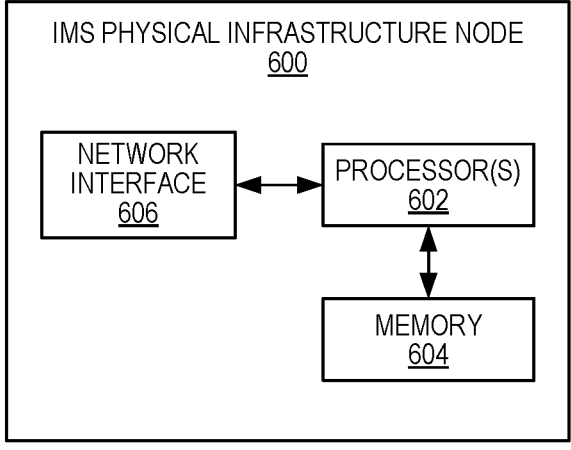
FIGS. 6 and 7 are schematic block diagrams of example embodiments of a physical infrastructure node.

FIG. 6 is a schematic block diagram of a physical infra- structure node 600. The network slices 310-1 through 310-N are logical or virtual networks that are implemented using virtualization technology on a number of physical infrastruc- ture nodes such as the IMS physical infrastructure node 600. In this regard, the NFs forming the network slices 310-1 through 310-N (e.g., the UPFs 312-1 through 312-N) are implemented as virtual nodes operating on a number of physical infrastructure nodes 600. Likewise, the common NFs (e.g., the UDM 314, HSS 316, AMF 318, SMF 320, PCF 322, and/or the NEF 324 may be implemented on one or more physical infrastructure nodes 600.

In this regard, as illustrated in FIG. 6, the physical infrastructure node 600 includes one or more processors 602 (e.g., Central Processing Units (CPUs), Application Specific Integrated Circuits (ASICs), Field Programmable Gate Arrays (FPGAs), and/or the like), memory 604, and a network interface(s) 606. In some embodiments, using vir- tualization, NF(s) (e.g., a UPF 312-*n*, the UDM 314, the HSS 316, the AMF 318, the SMF 320, the PCF 322, and/or the NEF 324) are implemented as virtual nodes that utilize physical resources (e.g., the processor(s) 602, the memory 604, and the network interface(s) 606) of one or more of the physical infrastructure nodes 600.

In some embodiments, a computer program including instructions which, when executed by at least one processor, causes the at least one processor to carry out the function- ality of network node or NF according to any of the embodiments described herein is provided. In some embodi- ments, a carrier comprising the aforementioned computer program product is provided. The carrier is one of an electronic signal, an optical signal, a radio signal, or a computer readable storage medium (e.g., a non-transitory computer readable medium such as memory).

Figure 7:
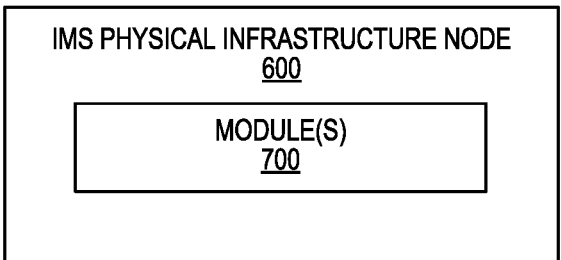

FIG. 7 is a schematic block diagram of the physical infrastructure node 600 according to some other embodi- ments of the present disclosure. The physical infrastructure node 600 includes one or more modules 700, each of which is implemented in software. The module(s) 700 provide the functionality of one or more of the NF(s) described herein (e.g., one or more functions of a UPF 312-*n*, the UDM 314, the HSS 316, the AMF 318, the SMF 320, the PCF 322, and/or the NEF 324, as described herein).

Figure 8:
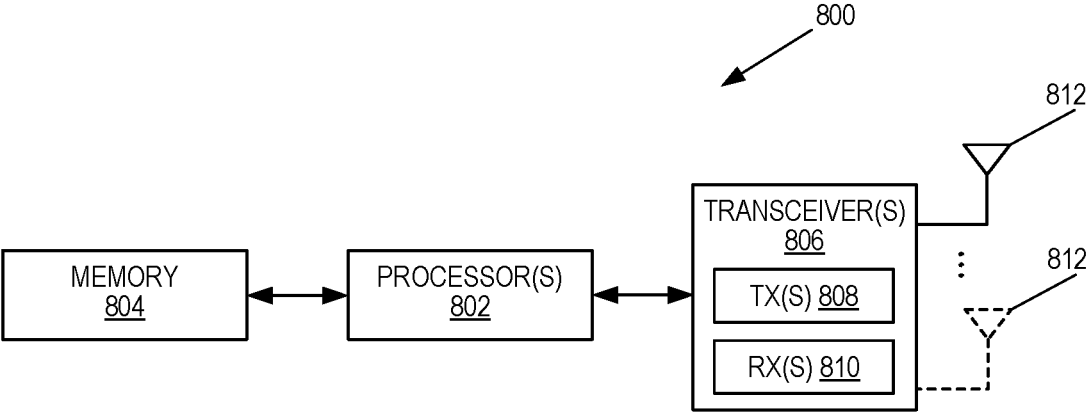
FIGS. 8 and 9 are schematic block diagrams of example embodiments of a wireless communication device such as a User Equipment (UE).

FIG. 8 is a schematic block diagram of a wireless communication device 800, such as the UE 308, according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
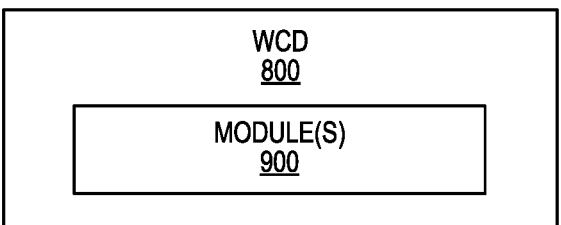

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
TCI Transmission Configuration Indicator
TRP Transmission/Reception Point
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method of operation of a network node in a core network of a cellular communications system for network slice handover, the method comprising:

detecting a triggering event for a network slice handover for a session of a particular wireless communication device;

responsive to detecting the triggering event for the network slice handover:

identifying a target network slice for the network slice handover for the session of the particular wireless communication device; and performing an action that initiates the network slice handover of the session of the particular wireless communication device from a source network slice to the target network slice wherein performing the action comprises sending, to a Policy and Control Function, PCF, in the core network, a message that initiates the network slice handover of the session of the particular wireless communication device from the source network slice to the target network slice;

wherein the message that initiates the network slice handover comprises information that identifies the target network slice;

wherein the information that identifies the target network slice is a Subscribed Network Slice Selection Assistance Information, S-NSSAI, of the target network slice;

wherein the source network slice is associated to a first Subscriber Identity Module, SIM, of the wireless communication device, the target network slice is associated to a second SIM of the wireless communication device, and the first and second SIMs are associated to a same network operator; and the method further comprises: providing an identity of a Session Management Function, SMF, to another network node to ensure that a same SMF is selected regardless of whether the first SIM or the second SIM is used.

2. A physical infrastructure node for implementing a network node for a core network of a cellular communications system for network slice handover, the physical infrastructure node comprising:

a network interface; and processing circuitry associated with the network interface comprising at least one processor and a memory, the memory comprising instructions which, when executed by the at least one processor, causes the physical infrastructure node to:

detect a triggering event for a network slice handover for a session of a particular wireless communication device; and responsive to detecting the triggering event for the network slice handover:

identify a target network slice for the network slice handover for the session of the particular wireless communication device; and perform an action that initiates the network slice handover of the session of the particular wireless communication device from a source network slice to the target network slice wherein performing the action comprises sending, to a Policy and Control Function, PCF, in the core network, a message that initiates the network slice handover of the session of the particular wireless communication device from the source network slice to the target network slice;

wherein the message that initiates the network slice handover comprises information that identifies the target network slice;

wherein the information that identifies the target network slice is a Subscribed Network Slice Selection Assistance Information, S-NSSAI, of the target network slice;

wherein the source network slice is associated to a first Subscriber Identity Module, SIM, of the wireless communication device, the target network slice is associated to a second SIM of the wireless communication device, and the first and second SIMs are associated to a same network operator; and the processing circuitry is further configured to cause the physical infrastructure node to: provide an identity of a Session Management Function, SMF, to another network node to ensure that a same SMF is selected regardless of whether the first SIM or the second SIM is used.

* * * * *